(12) United States Patent
Esparza et al.

(10) Patent No.: US 7,771,522 B2
(45) Date of Patent: Aug. 10, 2010

(54) SEPARATOR FOR MULTI-PHASE SLUG FLOW AND METHOD OF DESIGNING SAME

(75) Inventors: Jose Oscar Esparza, Katy, TX (US); George John Zabaras, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/427,423

(22) Filed: Apr. 21, 2009

(65) Prior Publication Data

US 2009/0218278 A1    Sep. 3, 2009

Related U.S. Application Data

(62) Division of application No. 11/284,304, filed on Nov. 21, 2005, now Pat. No. 7,540,902.

(60) Provisional application No. 60/630,890, filed on Nov. 24, 2004.

(51) Int. Cl.
*B01D 19/00* (2006.01)

(52) U.S. Cl. .............................. 96/204; 95/253; 95/260; 95/243; 96/182; 96/215; 166/357

(58) Field of Classification Search ................... 95/253, 95/260, 243; 96/182, 204, 215, 184; 210/537; 166/357
See application file for complete search history.

(56) References Cited

U.S. PATENT DOCUMENTS

| 1,496,090 | A | * | 6/1924 | Marker et al. | ........... 210/170.01 |
| 1,939,988 | A | * | 12/1933 | Knoles | ........................ 210/136 |
| 2,507,273 | A | * | 5/1950 | Schultz | ......................... 96/411 |
| 3,384,169 | A | * | 5/1968 | Leonard | ...................... 166/357 |
| 5,288,312 | A | * | 2/1994 | Payne et al. | .................... 96/158 |

* cited by examiner

*Primary Examiner*—Duane Smith
*Assistant Examiner*—Douglas J Theisen
(74) *Attorney, Agent, or Firm*—William E. Hickman

(57) ABSTRACT

A slug flow separator facilitates the separation of a mixture flow into component parts. The separator includes an upper-tier elongate conduit, a lower-tier elongate conduit and a plurality of spaced apart connectors. Each of the upper and lower-tier elongate conduits has an outlet and at least one of the upper and lower-tier elongate conduits has an inlet for receiving the mixture flow. The upper and lower-tier elongate conduits also each have a plurality of openings such that one connector of the plurality of connectors may interconnect one of the upper-tier elongate conduit openings with a one of the lower-tier elongate conduit openings. The connectors enable communication of at least one of a liquid component and the at least one of another liquid component and a gas component of the mixture flow therebetween.

6 Claims, 2 Drawing Sheets

SEPARATOR FOR MULTI-PHASE SLUG FLOW AND METHOD OF DESIGNING SAME

CROSS-REFERENCE TO RELATED APPLICATIONS

This application is a divisional application of U.S. Non-Provisional patent application Ser. No. 11/284,304 filed Nov. 21, 2005, which has issued as U.S. Pat. No. 7,540,902, and which claims priority to U.S. Provisional Application 60/630,890 filed on Nov. 24, 2004. U.S. Provisional Application 60/630,890 filed on Nov. 24, 2004 is herein incorporated by reference in its entirety.

BACKGROUND OF THE INVENTION

This invention relates generally to handling a flowing mixture, and more specifically to progressive separation of a slug flow into constituent parts within closed pipelines based at least in part on the principles of buoyancy and gravity.

In the field of oil production and transmission, flows of two-phase mixtures (e.g., gas-liquid mixtures) (hereinafter referred to as "two-phase flows") or other mixtures of constituent parts having varying densities (e.g., liquid-liquid mixtures, gas-liquid mixtures, gas-gas mixtures) (hereinafter referred to as "mixture flows") are commonly encountered. This is especially true in production carrier pipelines conveying oil mixtures from a producing well. Producing wells, for example, may contain a mixture of oil, water and various gases that are extracted as a mixture flow through a pipeline. These flows must be received by oil handling systems and separated into constituent or component parts based on phase or density for treatment and subsequent distribution to end users.

It is often desirable for flow separation of a mixture to occur prior to the transmission thereof through significant lengths of pipelines. Early mixture flow separation enables mechanical devices functioning within oil production and transmission systems to manage component flows each having substantially only one phase or range of densities. Examples of such mechanical devices include compressors utilized for compressing materials in gaseous states and pumps for moving the flow of liquids. By managing component flow of a single phase or density range, these mechanical devices can be engineered for optimum performance while reducing stresses placed on respective oil handling systems.

Mixture flow separation, however, is not without its difficulties. First of all, many producing wells are positioned at remote locations and in harsh environments, such as on a deep sea floor. In those situations, achieving separate component part flows shortly after the corresponding mixture flow (which may, for instance, include a two-phase flow) leaves the well requires a separation system to be located where it is not easy to install nor easy to access when system maintenance is needed. Further, most conventional systems that achieve efficient component separation may be quite bulky and heavy, reducing the desirability of using such separation systems on overseas platforms where weight and space considerations are a high priority.

One separation system design involves the use of a centrifugal force separator: essentially a curved pathway in a transmission or carrier line with one or more radial ports or annular channels. When a mixture flow achieves a sufficient velocity, centrifugal force will move the denser component (e.g., liquid) to the outside of the curve and into the ports or channels that carry the liquid into a storage container. While this design achieves a certain degree of separation for some mixture flows, it is not very effective for mixtures in the form of slug flows. Slug flow refers to an uneven distribution of components in a mixture flow that creates undesirable cyclic flow characteristics for the mixture. Due to slug flow, surges of components of the flowing mixture (e.g., gas or liquid) may be realized at any given point along the transmission pipeline, impeding efficient mixture flow and causing increase stresses on mechanical devices of the transmission system. Because the mixture flow components often do not arrive at various points in transmission at the same time, centrifugal force separators have a difficult time properly segregating the mixture flow components from one another. Thus, the prior art has not provided a solution for separating mixture flows into constituent parts in a simple and effective manner.

BRIEF SUMMARY OF THE INVENTION

In one aspect of the present invention, a separator is provided for substantially separating a two-phase flow into a gas component and a liquid component. The separator includes an upper-tier elongate conduit, a lower-tier elongate conduit and a plurality of spaced apart connectors. Each of the upper and lower-tier elongate conduits has an outlet and at least one of the upper and lower-tier elongate conduits has an inlet for receiving the two-phase flow. The inlet is positioned opposite the outlet relative to at least one of the plurality of connectors. The upper and lower-tier elongate conduits also each have a plurality of openings such that one connector of the plurality of connectors may interconnect one of the upper-tier elongate conduit openings with one of the lower-tier elongate conduit openings. The connectors enable communication of at least one of the gas component and liquid component therebetween.

In another aspect, the invention provides a separator for substantially separating a mixture flow into a liquid component and at least one of another liquid component and a gas component. The separator includes an upper-tier elongate conduit, a lower-tier elongate conduit and a plurality of spaced apart connectors, the upper and lower-tier elongate conduits being parallel with one another. Each of the upper and lower-tier elongate conduits has an outlet and at least one of the upper and lower-tier elongate conduits has an inlet for receiving the mixture flow. The upper and lower-tier elongate conduits also each have a plurality of openings such that one connector of the plurality of connectors may interconnect one of the upper-tier elongate conduit openings with a one of the lower-tier elongate conduit openings. The connectors enable communication of at least one of the liquid component and the at least one of the another liquid component and a gas component therebetween.

In another aspect, the invention provides provides a separator for substantially separating a mixture flow into a liquid component and at least one of another liquid component and a gas component. The separator includes an upper-tier elongate conduit, a lower-tier elongate conduit and a plurality of spaced apart connectors, the upper-tier elongate conduit being spaced from and above the lower-tier elongate conduit. Each of the upper and lower-tier elongate conduits has an outlet and at least one of the upper and lower-tier elongate conduits has an inlet for receiving the mixture flow. The upper and lower-tier elongate conduits also each have a plurality of openings such that one connector of the plurality of connectors may interconnect one of the upper-tier elongate conduit openings with a one of the lower-tier elongate conduit openings. The connectors enable communication of at least one of the liquid component and the at least one of the another liquid component and a gas component therebetween.

In another aspect, the invention provides a separator for substantially separating a mixture flow into a liquid component and at least one of another liquid component and a gas component. The separator includes an upper-tier elongate conduit, a lower-tier elongate conduit and a plurality of spaced apart connectors, wherein the connectors are aligned generally perpendicular to a horizontal reference plane. Each of the upper and lower-tier elongate conduits has an outlet and at least one of the upper and lower-tier elongate conduits has an inlet for receiving the mixture flow. The upper and lower-tier elongate conduits also each have a plurality of openings such that one connector of the plurality of connectors may interconnect one of the upper-tier elongate conduit openings with a one of the lower-tier elongate conduit openings. The connectors enable communication of at least one of the liquid component and the at least one of the another liquid component and a gas component therebetween.

In another aspect, the invention provides a separator for substantially separating a mixture flow into component parts based on the densities of the component parts. An upper-tier elongate conduit, a lower-tier elongate conduit and a plurality of spaced apart connectors form the separator. Each of the upper and lower-tier elongate conduits has an outlet and at least one of the upper and lower-tier elongate conduits has an inlet for receiving the mixture flow. The inlet is positioned opposite the outlet relative to at least one of the plurality of connectors. The upper and lower-tier elongate conduits also each have a plurality of openings such that one connector of the plurality of connectors may interconnect one of the upper-tier elongate conduit openings with a one of the lower-tier elongate conduit openings. The connectors enable communication of at least one of the component parts therebetween.

In another aspect, the invention provides a separator for substantially separating a mixture flow into a liquid component and at least one of another liquid component and a gas component. An upper-tier elongate conduit, a lower-tier elongate conduit and a plurality of spaced apart connectors form the separator. The lower-tier elongate conduit is spaced from and below the upper-tier elongate conduit such that the lower-tier elongate is parallel with the upper-tier elongate conduit. Each of the upper and lower-tier elongate conduits has an outlet and at least one of the upper and lower-tier elongate conduits has an inlet for receiving the mixture flow. The inlet is positioned opposite the outlet relative to at least one of the plurality of connectors. The upper and lower-tier elongate conduits also each have a plurality of openings such that one connector of the plurality of connectors may interconnect one of the upper-tier elongate conduit openings with a one of the lower-tier elongate conduit openings. The connectors are aligned generally perpendicular to a horizontal reference plane, and enable communication of at least one of the liquid component and the at least one of the another liquid component and a gas component therebetween.

In another aspect, the invention provides a system for substantially separating a mixture flow into component parts. The system includes an array of upper-tier elongate conduits laterally spaced apart from one another, an array of lower-tier elongate conduits laterally spaced apart from one another, and a plurality of connectors. Each conduit of the array of upper and lower-tier elongate conduits has an upstream end, a downstream end with an outlet, and a plurality of openings spaced apart along the length of the conduit between the upstream and downstream ends. At least one of the array of upper-tier elongate conduits and the array of lower-tier elongate conduits includes inlets at the upstream ends thereof for receiving the mixture flow. Each connector is configured for interconnecting a corresponding one of the plurality of openings of one of the upper-tier elongate conduits with a corresponding one of the plurality of openings of the lower-tier elongate conduits to enable communication of at least one of the component parts therebetween.

In another aspect, the invention provides a method of slug flow separation. The method involves introducing a slug flow comprising a liquid component and at least one of another liquid component and a gas component into a separator at a predetermined velocity. The separator includes an upper-tier elongate conduit and a lower-tier elongate conduit connected to the upper-tier elongate conduit, at least one of the upper-tier and lower-tier elongate conduits having an inlet and each of the upper-tier and lower-tier elongate conduits having an outlet. At a next step, substantially separation of the liquid component from the at least one of the another liquid component and the gas component takes place within the separator. The liquid component is then substantially expelled out through the outlet of one of the upper-tier elongate conduit and the lower-tier elongate conduit. Finally, the at least one of the another liquid component and the gas component is substantially expelled out through the outlet of another one of the upper-tier elongate conduit and the lower-tier elongate conduit.

In another aspect, the invention provides a method for designing a separator for substantially separating a slug flow given a maximum hydrodynamic slug volume to be handled by the separator. The slug flow handled by the separator comprises a liquid component and at least one of another liquid component and a gas component. In a first step of the method, an upper-tier elongate conduit is selected having a predetermined inside diameter and length. The upper-tier elongate conduit includes a plurality of openings spaced apart along the length thereof and an outlet. Next, a lower-tier elongate conduit is selected having a predetermined inside diameter and length. The lower-tier elongate conduit likewise includes a plurality of openings spaced apart along the length thereof and an outlet. A plurality of connectors are then selected. Each connector interconnects a corresponding one of the plurality of openings of the upper-tier elongate conduit with a corresponding one of the plurality of openings of the lower-tier elongate conduit, thereby enabling enable communication of the liquid component and the at least one of the another liquid component and the gas component therebetween. Each of the connectors has a predetermined inside diameter and length. The total number of connectors selected is based on the predetermined inside diameter and length for the upper-tier elongate conduit, the lower-tier elongate conduit, and each connector such that the total interior volume of the separator is at least about the maximum hydrodynamic slug volume.

DETAILED DESCRIPTION OF THE INVENTION

Figure 1:
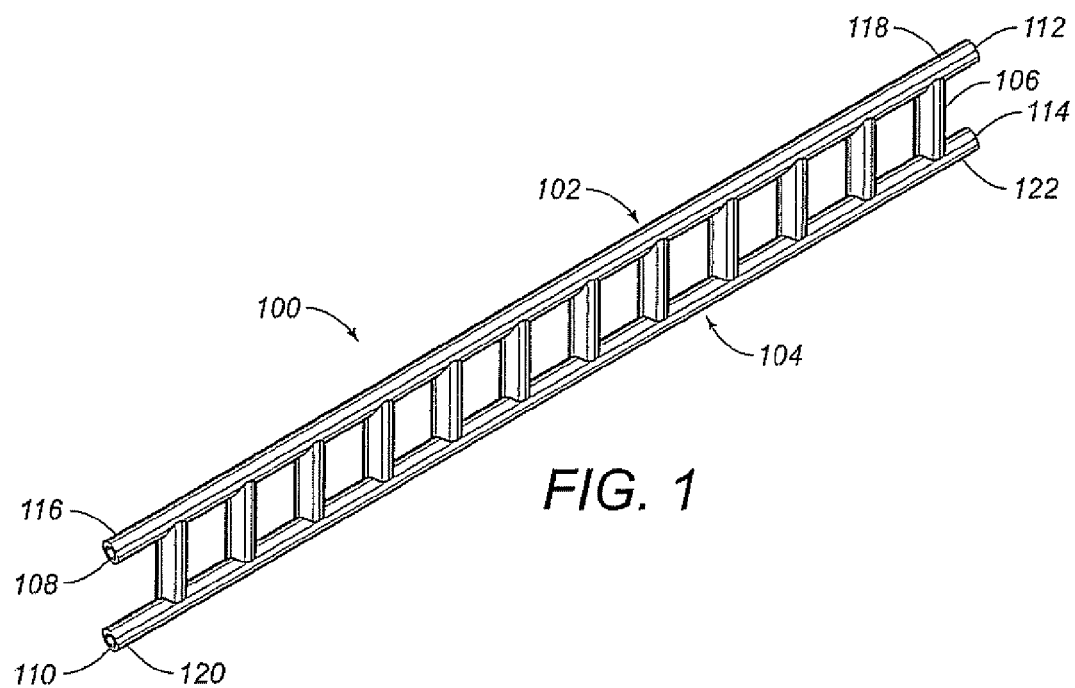
FIG. 1 is a perspective view of a separator in accordance with one embodiment of the present invention.

Referring now to the figures, wherein like reference numbers indicate like components, and in particular to FIG. 1, a separator of one embodiment of the present invention is indicated generally by the numeral 100. The separator 100 is configured to substantially separate a mixture flow (including two-phase flows) into component parts based on the corresponding density of each component part. The mixture flow may be a gas-gas mixture, a gas-liquid mixture, or a liquid-liquid mixture, as examples. The separator 100 is particularly useful in applications where the mixture flow is a slug flow because the separator does not depend on the mixture flow to be supplied with an equal distribution of component parts at any given point in time. In fact, the separator 100 is designed handle cyclic flow characteristics in a mixture flow and still achieve good segregation of component parts of the flow from one another such that the component parts may be processed accordingly in an oil production and/or transmission system.

The separator 100 includes upper-tier elongate conduit 102, lower-tier elongate conduit 104, and plurality of connectors 106 extending between upper and lower-tier conduits 102, 104. As will be more fully explained herein, the number of connectors 106 may be chosen based on various factors, but as a general rule, a larger number of connectors 106 provides more complete segregation of the component parts of a mixture flow. In the embodiment shown in FIG. 1, both the upper-tier elongate conduit 102 and the lower-tier elongate conduit 104 have an inlet 108, 110, respectively, for receiving the mixture flow from a production carrier pipe or other transmission pipe (not shown). However, the separator 100 may also have only a single inlet on one of the upper and lower-tier elongate conduits 102, 104. The upper and lower-tier elongate conduits 102, 104 also each have an outlet 112, 114, respectively, for expelling substantially segregated component part flows of the mixture flow out of the separator 100 for further processing or storage by the oil production and/or transmission system. For example, each component part flow leaving the outlet 112, 114 may enter a downstream transmission or carrier pipeline to deliver the respective component part flows to areas where they can be processed (e.g., deliver liquid petroleum from the separator 100 on a sea floor to an oversea platform for processing). The outlets 112, 114 preferably connect with another component of a closed system (whether a transmission or carrier pipeline, or otherwise) to maintain pressurization of the mixture flow through the separator 100 and thereby achieve efficient component part segregation.

The inlet 108 and the outlet 112 of the upper-tier elongate conduit 102 are located at an upstream end 116 and a downstream end 118, respectively, of the conduit 102. Likewise, inlet 110 and the outlet 114 of the lower-tier elongate conduit 104 are located at an upstream end 120 and a downstream end 122, respectively, of the conduit 104. FIG. 1 also shows one embodiment of the separator 100 where the upper and lower-tier elongate conduits 102, 104 are arranged in a vertical alignment with respect to one other, such that the connectors extend away from a horizontal reference plane (i.e., a sea floor or other surface) underlying the separator 100. The upper and lower-tier elongate conduits 102, 104 may also be parallel with each another, and the connectors 106 may be equally spaced from one another and orthogonally aligned with respect to the conduits 102, 104. It should be understood, however, that different configurations and spatial relationships for the upper and lower-tier elongate conduits 102, 104 and the plurality of connectors may be envisioned by those of skill in the art depending on the desired mixture flow separation results. The separator 100 may also be fabricated from a variety of materials, but preferably includes metals that have substantial strength to withstand the hoop stress and other stresses that will be placed on the separator when placed into service. Additionally, the connectors 106 are preferably welded to the upper and lower-tier elongate conduits 102, 104 to form the separator 100 as a rigid, monolithic unit.

Figure 2:
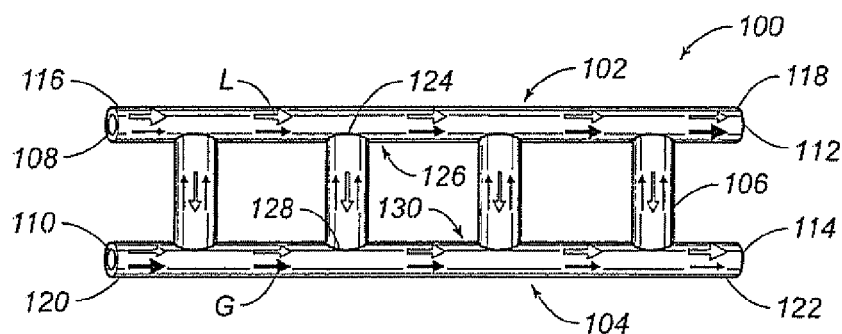
FIG. 2 is a side elevational view of the separator of FIG. 1, showing a representative flow pattern for a mixture flow within the separator.

The flow pattern for one exemplary mixture flow including a gas component and a liquid component traveling through the separator 100 is shown in FIG. 2. The connectors 106 facilitate the movement of a lower density component part of the mixture flow (e.g., the gas component, whose flow pattern within the separator 100 is indicated by black arrows G) and the higher density component part of the mixture flow (e.g., the liquid component, whose flow pattern within the separator 100 is indicated by the white arrows L) between the upper and lower-tier elongate conduits 102, 104 acting under the principles of buoyancy. The upper-tier elongate conduit 102 has a plurality of spaced apart openings 124 on one longitudinal side 126 thereof, and the lower-tier elongate conduit 104 has a plurality of spaced apart openings 128 on one longitudinal side 130 thereof. Each connector 106 interconnects the upper and lower-tier elongate conduits 102, 104 together by extending from one opening 124 of the upper-tier elongate conduit 102 to a corresponding opening 128 of the lower-tier elongate conduit 104. A production carrier pipe may deliver mixture flow directly to either of the inlets 108, 110 of the upper and lower-tier conduits 102, 104, respectively, and a secondary transmission pipe may split off from the production carrier pipe upstream of the separator 100 to deliver a portion of the original mixture flow being transmitted by the production carrier pipe to another one of the inlets 108, 110 of the upper and lower-tier conduits 102, 104, respectively. Thus, the mixture flow into the inlets 108, 110 of the upper and lower-tier conduits 102, 104, respectively, may arrive at a predetermined velocity. It should be understood, however, that other conduits besides production carrier pipes may be implemented to supply mixture flow to the separator 100.

When the mixture flow takes on the characteristics of slug flow, the different mixture flows received by each inlet 108, 110 at any particular point in time may not possess the same physical properties or component distribution as the mixture flow received at the other inlet. However, this discrepancy between the mixture flows can be managed by the separator 100 in a closed transmission system supplying mixture flow under pressure, principally because the separator 100 utilizes buoyancy principles to progressively separate component parts of the mixture flow moving from the inlets 108, 100 to the outlets 112, 114 of the separator. As can be seen in further detail in FIG. 2, the percentage by weight of the liquid component flow L in the mixture flow increases in the lower-tier elongate conduit 104 moving downstream as more liquid component in the upper-tier elongate conduit 102 falls down through the connectors 106 under the force of gravity. Likewise, the percentage by weight of the gas component flow G increases in the upper-tier elongate conduit 102 as more gas component in the lower-tier elongate conduit 104 rises up through the connectors 106 by buoyancy, being displaced out of the lower-tier elongate conduit 104 by the increasing amount of liquid component therein. Thus, under this separation regime, even if slug flow is encountered, so long as the interior volume of the separator 100 is sufficiently large to handle a given hydrodynamic slug volume, buoyancy principles will ensure that gas and/or liquid slugs will substantially flow to the appropriate one of the upper or lower-tier elongate conduit 102 or 104 by the time the mixture flow reaches the respective outlet 112 or 114.

To optimize the efficiency of flow characteristics of the mixture flow components (e.g., the liquid component and gas component), the upper and lower-tier elongate conduits 102, 104 and the connectors 106 are preferably cylindrical members, and thus have a circular or elliptical cross-section longitudinally. However, other cross-sectional shapes may be utilized as well. Additionally, in selecting a certain number of connectors 106 for the separator 100 necessary to achieve a desired level of mixture flow separation under a variety of flow regimes, the maximum hydrodynamic slug volume expected in mixture flows through the separator is preferably taken into consideration, as previously mentioned. Accordingly, the number of connectors 106 is an amount necessary to make the total interior volume of the separator greater than the maximum hydrodynamic slug volume expected. The calculation for the total interior volume involves summing up of the interior volumes of the upper-tier elongate conduit 102, the lower-tier elongate conduit 104, and the connectors 106 for the given numbers of connectors. The interior volume of the upper and lower-tier elongate conduits 102, 104, and the connectors 106, may be determined from the chosen length and inside diameters of each. When separating mixture flow components under conditions where one of the component parts is a liquid and another of the component parts is a gas or a liquid of a different density—especially when one of the liquids is petroleum—efficient mixture flow separation is facilitated if one or more of the connectors 106 has a length that is at least about five times the inside diameter thereof or greater, or if this length to diameter ratio is not possible, then a length of at least about five meters. This connector 106 configuration allows a liquid component entrained in the gas component flow G moving up one of the connectors 106 to settle out and drop back down to the lower-tier elongate conduit 104.

The separator 100 can also be optimally designed for certain flow regimes of the mixture flow. For instance, if a mixture flow expected to be encountered involves high flow velocities and a low percentage by volume of any liquid component present in the flow (i.e., a high percentage by volume of gas), a majority of the liquid component will flow with the accompanying gas component as entrained drops, with a portion of the liquid component flowing along an inside wall of the upper and lower-tier elongate conduits 102, 104. In this flow regime, only a small percentage of the liquid component will enter a given connector 106, and thus, a large number of connectors 106 will typically be necessary for the separator 100 to achieve strong segregation of the component part flows.

More freedom is provided the separator 100 designer when a flow regime involving intermediate mixture flow velocities and a moderate to high percentage by volume of any liquid component present in the flow. Under these conditions, slug flow often occurs. However, the separator 100 can usually achieve strong segregation of the component part flows even with only a moderate number of connectors 106. At intermediate mixture flow velocities and low percentage by volume of any liquid component present in the flow, and at low mixture flow velocities and nearly all liquid percentages, the separator 100 can often achieve strong segregation of the component part flows with only a small number of connectors (e.g., 3 or more).

Figure 3:
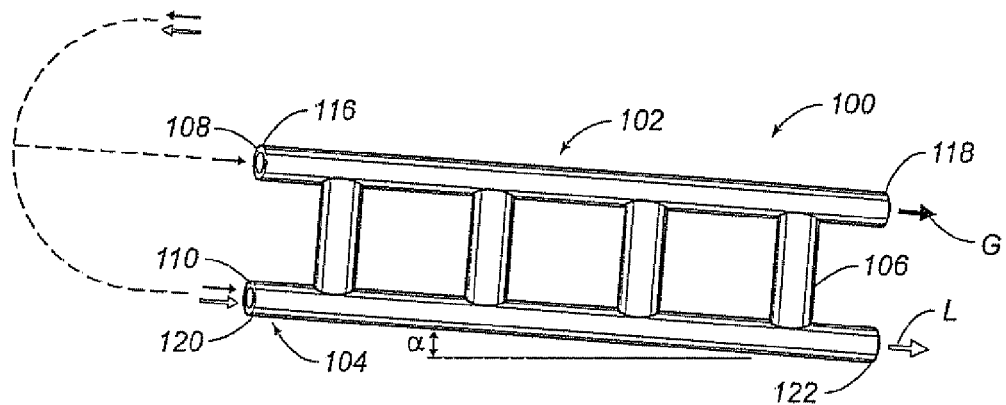
FIG. 3 is a side elevational view of the separator of FIG. 1 tilted with a downward slope.

The separator 100 may also be oriented as downward sloping relative to a horizontal reference plane (e.g., the sea floor or other surface), as shown in FIG. 3. In this arrangement, the angle α measures the degree of downward slope of the upper and/or lower-tier elongate conduits 102, 104. Separation of the mixture flow into component parts takes place with generally the same principles as a separator with no downward slope, with the difference lying in the stratification of the mixture flow, especially when in the form of a slug flow. The downward slope increases the velocity of any liquid component of the mixture flow due to gravity, which increases the degree of stratification with other component parts of differing densities within the mixture flow moving towards the downstream ends 120, 122 of the upper and lower-tier elongate conduits 102, 104, respectively. This stratification facilitates increased separation of the component parts of the mixture flow from one another. It has been found that at an angle α of about 30 to about 60, for example about 45 degrees for a downward slope of the separator 100 may be used for development of stratified flow for a range of flow regimes, though other angles will also facilitate good stratified flow. However, it should be understood that the separator 100 may be oriented in an upward sloping arrangement if necessary for certain applications (e.g., integration of the separator into a transmission line moving up a sloped surface), so long as the upper and lower-tier elongate conduits 102, 104 are not longitudinally aligned in a vertical plane orthogonal to the horizontal reference plane.

If excessive slug flow is not encountered by the transmission or carrier pipeline delivering the mixture flow to the separator 100, then a centrifugal separation device (not shown) may be coupled to the inlets 108, 110 of the upper and lower-tier elongate conduits 102, 104, respectively, the flow pattern within the centrifugal separation device being represented by the dashed lines in FIG. 3. Accordingly, a mixture flow (e.g., a gas and liquid flow) enters the centrifugal separation device, and a portion of the gas component flow is extracted and directed to the inlet 108 of the upper-tier elongate conduit 102. The remaining portion of the mixture flow now having a higher concentration of liquid component moves through the centrifugal separation device to the inlet 110 of the lower-tier elongate conduit 104. Thus, this first stage of mixture flow separation conducted by the centrifugal separation device enables the separator 100 to achieve strong segregation of the component part flows with fewer numbers of connectors 106.

Figure 4:
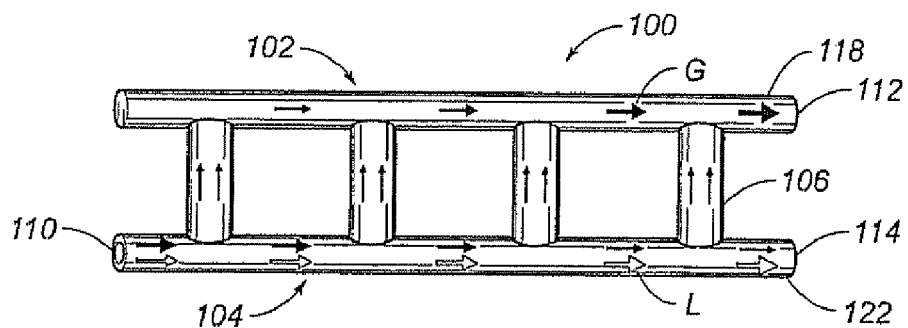
FIG. 4 is a side elevational view of another embodiment of a separator of the present invention having only an inlet in a lower-tier elongate conduit.

Another embodiment of the separator 100 is shown in FIG. 4, where the upper-tier elongate conduit 102 has no inlet. The only inlet for the separator 100 is the inlet 110 of the lower-tier elongate conduit 104. Thus, the upper-tier elongate conduit 102 should have virtually no amount of the higher density component flow therein. This arrangement is effective when the lower density component flow (e.g., gas) is sufficiently low in density compared to the higher density component flow of the mixture flow, such that the lower density component will easily be displaced into the upper-tier elongate conduit 102. Progressive separation of the component flows is still achieved moving downstream when a sufficient number of connectors 106 are used. As can be seen, the predominant flow pattern within the connectors 106 is a lower density component flow moving upward to the upper-tier elongate conduit 104.

Figure 5:
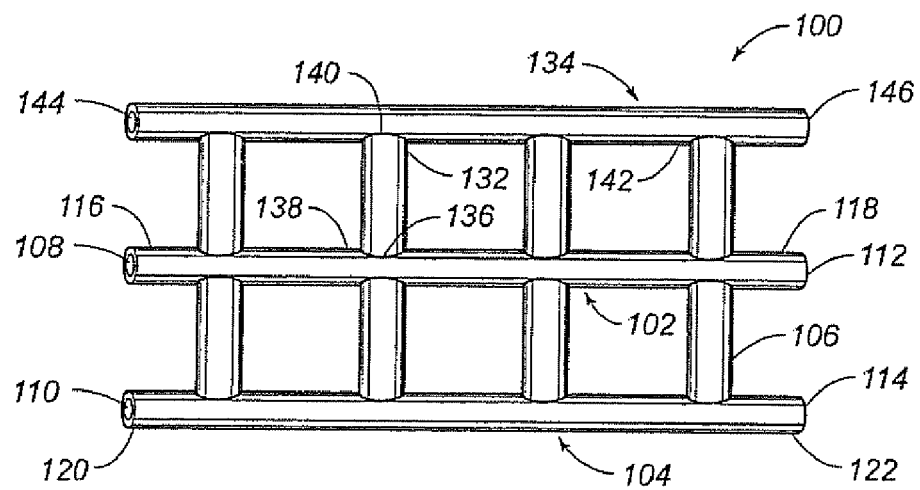
FIG. 5 is a side elevational view of another embodiment of a separator of the present invention having a third tier elongate conduit.

Further refinement of techniques for mixture flow separation is possible with the embodiment of the separator 100 shown in FIG. 5. The separator 100 of FIG. 5 includes the upper and lower-tier elongate conduits 102, 104 and connectors 106, but further comprises another plurality of connectors 132 and a third tier elongate conduit 134. The third tier elongate conduit 134 is generally positioned opposite the upper-tier elongate conduit 102 relative to the lower-tier elongate conduit 104. For example, the third tier elongate conduit 134 may be positioned directly above the upper-tier elongate conduit 102. Another plurality of spaced apart openings 136 are provided on the upper-tier elongate conduit 102 on a longitudinal side 138 thereof opposite of the longitudinal side 126 wherein the plurality of spaced apart openings 124 are located. The third tier elongate conduit 134 also has a plurality of spaced apart openings 140 on a longitudinal side 142 thereof. Each connector 132 interconnects the upper and third tier elongate conduits 102, 134 together by extending from one opening 136 of the upper-tier elongate conduit 102 to a corresponding opening 140 of the third tier elongate conduit 134, enabling communication of the component part flows of the mixture flow to travel therethrough. The third tier elongate conduit 134 may have an inlet 144 and an outlet 146 in a similar fashion to the inlet 108 and outlet 112 of the upper-tier elongate conduit 102, and a production carrier pipe or other secondary pipe may deliver a mixture flow to the inlet 144. By having three tiers of elongate conduits, the separator 100 of FIG. 5 provides an increased distance for lower density flow components to move via displacement, and higher density flow components to move via gravity, through the connectors 106, 132 to a respective tier of the elongate conduits 102, 104, 134. Furthermore, the separator 100 of FIG. 5 is well suited for separating a mixture flow having three component parts of differing densities (e.g., gas, water, and petroleum) into three component part flows through the respective outlets, with the highest density component flow leaving the outlet 104 of the lower-tier elongate conduit 104, the lowest density component flow leaving the outlet 146 of the third tier elongate conduit 134, and the middle density component flow leaving the outlet 112 of the upper-tier elongate conduit 102.

Figure 6:
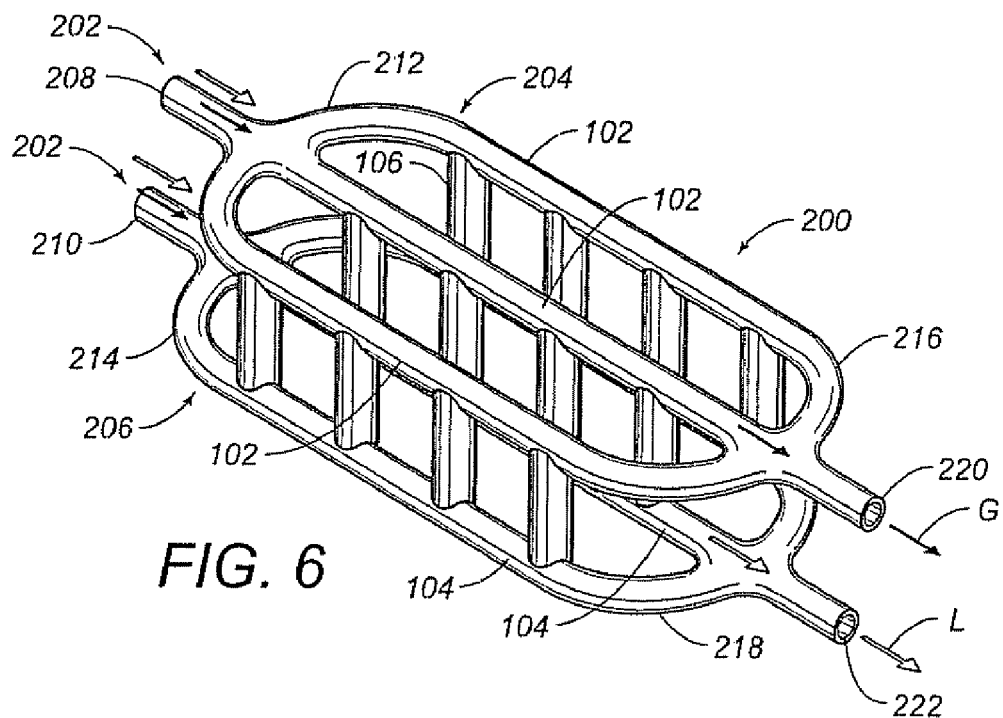
FIG. 6 is a perspective view of an embodiment of a separation system of the present invention implementing arrays of upper and lower-tier elongate conduits.

FIG. 6 shows a separation system 200 incorporating the principles of mixture flow separation utilized by the separator 100, but with increased throughput. One or more supply lines 202 (e.g., transmission or carrier pipeline) deliver the mixture flow to one or both of an array of upper-tier elongate conduits 204 and an array of lower-tier elongate conduits 206. For example, in the embodiment shown in FIG. 6, the arrays of upper and lower-tier elongate conduits 204, 206 have inlets 208, 210, respectively.

An upper inlet header 212 may be provided with the array of upper-tier elongate conduits 204, and a lower inlet header 214 may be provided with the array of lower-tier elongate conduits 206. The upper and lower headers 212, 214 divide the incoming mixture flows received through the inlets 208, 210, respectively, into individual upper-tier elongate conduits 102 and lower-tier elongate conduits 104, respectively.

The upper-tier elongate conduits 102 of the array 204 are laterally spaced apart from one another and are preferably generally aligned in the same lateral plane. Likewise, the lower-tier elongate conduits 104 of the array 206 are laterally spaced apart from one another and are preferably generally aligned in the same lateral plane. A plurality of the connectors 106 interconnect the array of upper-tier elongate conduits 204 with the array of lower-tier elongate conduits 206 to allow communication of mixture flow component parts therebetween. The array of upper-tier elongate conduits 204 may overlie the array of lower-tier elongate conduits 206 such that each individual upper-tier elongate conduit 102 may inter- connect with a corresponding one of the lower-tier elongate conduits 104 through a given set of the connectors 106.

An upper outlet header 216 may be provided with the array of upper-tier elongate conduits 204, and a lower outlet header 218 may be provided with the array of lower-tier elongate conduits 206. The upper and lower outlet headers 216, 218 may recombine the downstream flows received from the arrays of upper and lower-tier elongate conduits 204, 206, respectively—which are now substantially separated into respective component part flows—and expel the flows out of outlets 220, 222 of the arrays of upper and lower-tier elongate conduits 204, 206, respectively, for further processing of the component part flows as explained herein with respect to the separator 100 of FIGS. 1 and 2. The downstream component part flows may be, for example, expelled out of the outlets 220, 222 into takeoff lines (not shown).

One advantage to using the separation system 200 of FIG. 6 over the separator 100 of FIG. 2 is space requirements in some applications. When a large flow rate of a mixture is encountered, the utilization of only a single upper-tier elongate conduit 102 and a single lower-tier elongate conduit 104 may in certain circumstances require exceedingly long connectors 106 to allow for efficient movement of component parts of the mixture flow. However, there may not be enough vertical room in certain locations where separation must take place for a very tall device. The use of arrays of upper and lower-tier elongate conduits 204, 206 provides the ability to use a larger number of conduits of a shorter length to achieve efficient mixture flow separation.

In some embodiments, upper-tier elongate conduit 102, lower-tier elongate conduit 104, and/or plurality of connectors 106 have a cross-sectional area at least about 125% of the cross-sectional area of inlets 108, 110 and/or inlet production carrier pipe or other transmission pipe (not shown), for example at least about 150%, or at least about 200%.

In some embodiments, plurality of connectors 106 is between about 2 and about 100 connectors, for example between about 5 and about 50 connectors, or between about 10 and about 20 connectors.

EXAMPLE

A separator 100 was constructed out of 4-inch transparent PVC pipe, having upper and lower-tier elongate conduits 102, 104 formed with a length of about 30 feet, and 12 connectors 106 each being about 10.5 inches long and spaced about 29 inches apart center-to-center. Inclination angles (i.e., the negative value of downward sloping angle α) were chosen over a broad range of values. In an upward sloping arrangement for the separator 100, the internal volume of the connectors 106 is preferably around one-third the total internal volume of the separator. Therefore, the upper and lower-tier elongate conduits 102, 104 are each about 66.7 diameters long, and the connectors are each about 5.56 diameters long. The results of the experiment are shown in the following table:

| Test Number | Inclination angle, degree | Gas Rate, scf/min | Liquid Rate, gpm | Inlet Pressure, psig | Inlet Temperature, F. | Outlet Pressure, psig | Outlet Temperature, F. | Liquid Rate in Gas Outlet, gpm | % Liquid in Gas Outlet |
|---|---|---|---|---|---|---|---|---|---|
| 1 | 19.5 | 99.9 | 180.6 | 33.9 | 89.7 | 0 | 89.6 | 1.98 | 1.1 |
| 2 | 41 | 101 | 181.1 | 34.3 | 76.8 | 0 | 76.8 | 0.83 | 0.5 |

-continued

| Test Number | Inclination angle, degree | Gas Rate, scf/min | Liquid Rate, gpm | Inlet Pressure, psig | Inlet Temperature, F. | Outlet Pressure, psig | Outlet Temperature, F. | Liquid Rate in Gas Outlet, gpm | % Liquid in Gas Outlet |
|---|---|---|---|---|---|---|---|---|---|
| 3 | 41 | 107.7 | 69.3 | 15 | 79 | 0 | 78.7 | 0 | 0 |
| 4 | 20.5 | 124.35 | 119.56 | 35.4 | 88.8 | 0 | 88.3 | 0.528 | 0.4 |
| 5 | 30.5 | 200 | 200 | 22.4 | 85.7 | 0 | 94.7 | 0 | 0 |
| 6 | 50.75 | 243.2 | 121.1 | 35.9 | 91.5 | 0 | 91 | 1.98 | 1.6 |
| 7 | 9.5 | 245 | 119.21 | 37.3 | 89.7 | 0 | 89.3 | 1.056 | 0.9 |
| 8 | 3.6 | 52.8 | 129.5 | 17 | 79.9 | 0 | 76 | 4.529 | 3.5 |
| 9 | 3.6 | 108.9 | 128.35 | 22.5 | 71.5 | 0 | 67 | 2.438 | 1.9 |
| 10 | 3.6 | 99.6 | 179.35 | 32 | 91.2 | 0 | 85 | 6.34 | 3.5 |
| 11 | 14 | 99.2 | 182.1 | 33 | 87 | 0 | 87 | 3.96 | 2.2 |
| 12 | 19.5 | 99.9 | 180.2 | 34 | 86.8 | 0 | 86.8 | 1.98 | 1.1 |

As can be seen from the chart, the separator 100 provides good separation of the liquid component part from the gas component part flow at a variety of flow rates, even when the separator is placed at a range of upwardly sloping inclination angles.

Therefore, the slug flow separator of the present invention provides a solution for managing slug flows and separating component parts of the slug flow in an apparatus that may easily be integrated with existing production carrier pipes and other transmission pipes and deployed to a variety of locations. The slug flow separator also requires little to no maintenance due to the simple design and construction, and may be configured with a necessary number of connectors between the tiers (e.g., upper and lower-tier elongate conduits) to achieve progressive and efficient separation for a variety of anticipated mixture flows therethrough. Furthermore, since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

The invention claimed is:

1. A subsea separation system, comprising:
a producing well on a sea floor comprising a production pipe outlet, the production pipe outlet comprising a mixture of oil, water and various gases;
a separator on the sea floor connected to the producing well, the separator comprising:
an upper-tier elongate conduit having a plurality of openings spaced apart along the length thereof and an outlet for the various gases;
a lower-tier elongate conduit having a plurality of openings spaced apart along the length thereof and an outlet for the oil and water;
a plurality of connectors, each connector interconnecting a corresponding one of the plurality of openings of the upper-tier elongate conduit with a corresponding one of the plurality of openings of the lower-tier elongate conduit to enable communication of the various gases and the oil and water therebetween; and
wherein at least one of the upper-tier and lower-tier elongate conduits includes an inlet connected to the production pipe outlet;
a gas export pipeline connected to the outlet for the various gases at a first end and a second end connected to a production facility located on a surface of a body of water or on land; and
a liquid export pipeline connected to the outlet for the oil and water at a first end and a second end connected to the production facility.

2. The system of claim 1, wherein the lower-tier elongate conduit extends generally in the same direction as the upper-tier elongate conduit.

3. The system of claim 1, wherein both of the upper-tier and lower-tier elongate conduits include an inlet connected to the production pipe outlet.

4. The system of claim 1, wherein the plurality of connectors are equally spaced along the length of the upper-tier and lower-tier elongate conduits.

5. The system of claim 1, wherein the plurality of connectors are aligned orthogonally with respect to both of the upper-tier and lower-tier elongate conduits.

6. The system of claim 1, wherein the upper-tier elongate conduit comprises a production carrier pipe and the lower-tier elongate conduit comprises a secondary pipe.

* * * * *